United States Patent
Seo et al.

(10) Patent No.: US 7,106,783 B2
(45) Date of Patent: Sep. 12, 2006

(54) METHOD AND APPARATUS FOR SEARCHING MULTIPATHS OF MOBILE COMMUNICATION SYSTEM

(75) Inventors: Kyung Sam Seo, Gyunggi-do (KR); Dong Jo Park, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 708 days.

(21) Appl. No.: 10/017,425

(22) Filed: Dec. 18, 2001

(65) Prior Publication Data

US 2002/0075946 A1 Jun. 20, 2002

(30) Foreign Application Priority Data

Dec. 19, 2000 (KR) ............................... 2000-78607
Dec. 29, 2000 (KR) ............................... 2000-86229

(51) Int. Cl.
H04B 15/00 (2006.01)
H04K 1/00 (2006.01)
H04L 27/30 (2006.01)

(52) U.S. Cl. ..................... 375/148; 375/144; 375/142; 375/150; 370/500

(58) Field of Classification Search ................ 375/147, 375/149, 148, 150, 130, 140, 144, 285, 346, 375/348, 349; 455/522; 370/208, 491, 498, 370/500, 335, 342
See application file for complete search history.

(56) References Cited

U.S. PATENT DOCUMENTS

2002/0057730 A1* 5/2002 Karlsson et al. ............ 375/152
2002/0110140 A1* 8/2002 Juntti et al. ................. 370/441

* cited by examiner

Primary Examiner—Jean B Corrielus
(74) Attorney, Agent, or Firm—Fleshner & Kim, LLP (57) ABSTRACT

The present invention discloses a method for searching multipaths of a mobile communication system, which includes the steps of: performing a coherent detection on a reversed I and Q channel signals of a DPCCH transmitted form a mobile station, multiplying the detected signal by a pilot pattern to accumulate a pilot symbol section in a corresponding section, and performing a coherent accumulation on the other symbol section in a symbol basis; calculating energy value for each coherently accumulated I and Q channel signals; multiplying the calculated energy values by a weight that has been multiplied by the pilot symbol section and another weight that has been multiplied by the other symbol section, respectively; noncoherently accumulating the energy values multiplied by variable weights, and saving the energy values; comparing the saved energy values with a periodically designated threshold; and searching timing information as many as a number of fingers in order of highest energy value according to the comparison result.

21 Claims, 7 Drawing Sheets

| No. of Pilot Symbols(Pn) | Weight of Pilot Section(Wc 1) | Weight of the other symbol section(Wc 2) |
|---|---|---|
| 3 | 3/4 | 1/4 |
| 4 | 4/5 | 1/5 |
| 5 | 5/6 | 1/6 |
| 6 | 6/7 | 1/7 |
| 7 | 7/8 | 1/8 |
| 8 | 8/9 | 1/9 |

| SF of DPDCH(SF$_d$) | Wd | Wc |
|---|---|---|
| 256 | 1/2 | 1/2 |
| 128 | 2/3 | 1/3 |
| 64 | 4/5 | 1/5 |
| 32 | 8/9 | 1/9 |
| 16 | 16/17 | 1/17 |
| 8 | 32/33 | 1/33 |
| 4 | 64/65 | 1/65 |

METHOD AND APPARATUS FOR SEARCHING MULTIPATHS OF MOBILE COMMUNICATION SYSTEM

BACKGROUND OF THE INVENTION

1. Field of the Invention

The present invention relates to mobile communication systems. In particular, the present invention relates to a method and an apparatus for searching multipaths of a mobile communication system at a higher speed by applying different weights to different pilot symbol numbers, using a dedicated physical control channel (hereinafter, it is referred to as DPCCH) in which data is received in a reverse link of asynchronous international mobile telecommunication for the 2000s (IMT-2000).

More particularly, the present invention relates to a method and apparatus for searching multipaths of a mobile communication system at a higher speed by multiplying different channel weights on different DPCCH energies in accordance with a spreading factor of the reverse dedicated physical data channel (hereinafter, it is referred to as DPDCH), given that a base station is aware of the spreading factor.

In general, a reverse link dedicated physical channel (hereinafter, it is referred to as DPCH) in the mobile communication system is divided into the DPDCH for transmitting data and DPCCH for transmitting control information. The channels are multiplexed into I/Q code, respectively, in a separate wireless frame before they are received.

Since a transmission signal in the wireless communication system is sent out to a receiver via multipaths, it is susceptible to many scattering objects, such as buildings, trees, or other moving objects. In addition, having compared an electromagnetic wave that travels through a direct path between a transmitter and a receiver with a radio path influenced by a number of scattering objects, the inventors learned that the field intensity at a receiving site varies on an hourly basis due to the attenuated signals and time delay en route. Therefore, by way of overcoming such problems, a new method to acquire faster multipaths in the mobile communication system has been studied.

Specifically, according to an aspect of the present invention, in case of searching the multipaths using an up-link DPCH without knowing the spreading factor of the reverse DPDCH, a variable weight is multiplied to a pilot section of the DPCCH land the other control symbol sections in order to find a total energy.

Another embodiment of the present invention finds the total energy by using the DPCCH and DPDCH, given that the spreading factor of the DPDCH is known, and obtains the total energy by multiplying a corresponding channel weight. On the top of that, the DPCCH and DPDCH can be selectively used for helping the base station to find multipaths of a mobile station a lot faster.

2. Description of the Related Art

The standards of Code Division Multiple Access (CDMA) in the asynchronous IMT-2000 system suggest that the base station transmit a pilot channel or a pilot symbol not only in a forward link but also receive one in a reverse link. Therefore, a receiver of the CDMA communication system based on the new standard should be able to conduct the search using the energy of the pilot signal both in the forward link and the reverse link.

Because the mobile communication system is usually 1-to-N communication, the pilot channel of the forward link is a common element of all mobile stations within a cell zone of the corresponding base station, and it takes a lot of power to transmit the pilot channel. In contrast, the dedicated pilot channel of the reverse link is dedicated to an individual mobile station so that it can be transmitted at a low power. Of course, the intensity of the power (i.e., energy) of the dedicated pilot channel in the reverse link can be varied a little, depending on the standards or data transmission rates.

Figure 1:
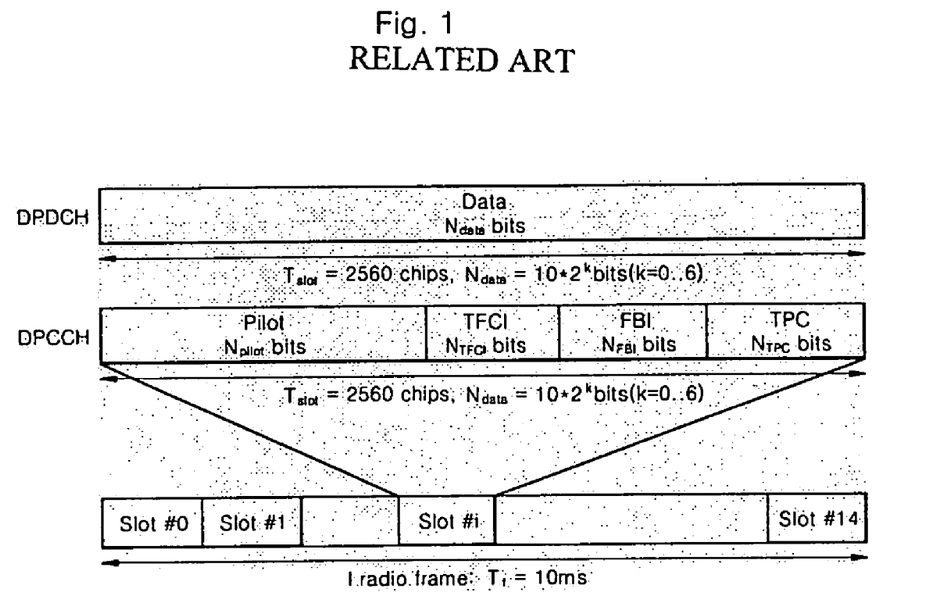
FIG. 1 is a format diagram showing a configuration of a reverse Dedicated Physical Channel (DPCH)

In order to find reverse multipaths in the asynchronous IMT-2000 system, the reverse DPCH shown in FIG. 1 is generally used. The DPCH is constituted of a time slot having 15 radio frames with a fixed or constant frequency ($T_f$=10 ms), and it includes the DPDCH and the DPCCH.

Normally, a time slot is constituted of 2560 chips. Especially the 2650 chips of the DPCCH includes a pilot symbol section ($N_{pilot}$ bits), and a transport format combination indicator, TFCI ($N_{TFCI}$ bits) as a control symbol, and feedback information, FBI ($N_{FBI}$ bits), and transmit power control information, TPC ($N_{TPC}$ bits).

According to one of traditional CDMA methods of searching multipaths, the dedicated channel in the communication system was coherently accumulated on a symbol basis for calculating energy. And, the calculated energy value was then noncoherently accumulated to a certain number, which was eventually used for calculating the energy value of the multipaths.

Figure 2:
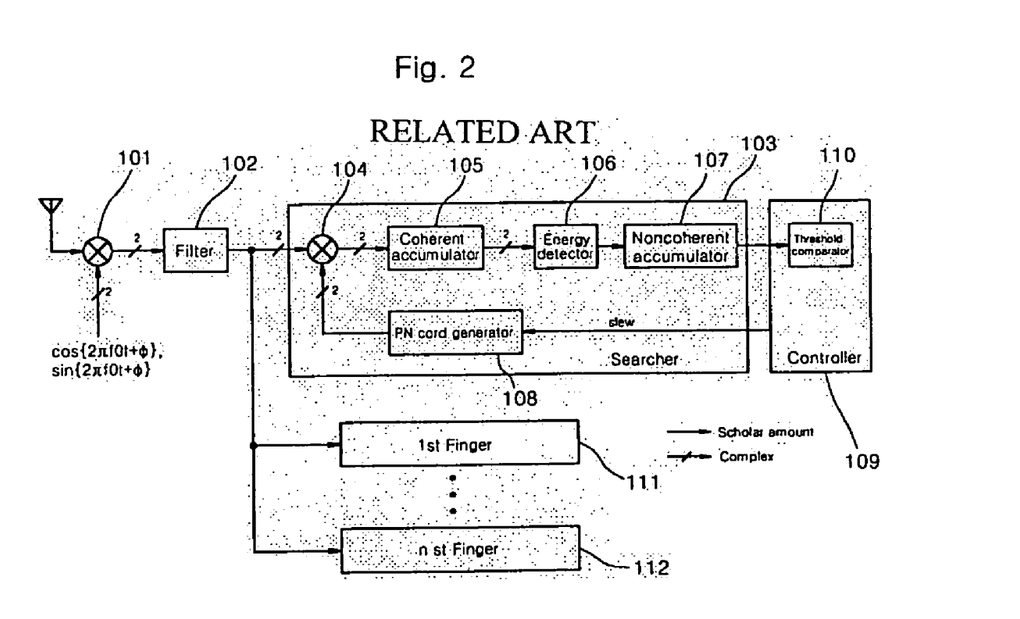
FIG. 2 is a block diagram showing a configuration of a receiver of a Code Division Multiple Access (CDMA) communication system in the related art.

FIG. 2 is a block diagram illustrating a configuration of a receiver for a CDMA communication system in the related art.

Referring to FIG. 2, a first multiplier 101 in the receiver for the traditional CDMA communication system separates an inputted signal through an antenna into I channel and Q channel, respectively, and the separated signal is filtered out at a Filter 102. Then a second multiplier 104 multiplies the filtered signal by a pseudo noise (PN) code generated by a pseudo noise code generator 108 of a searcher 103, and outputs the result. On the other hand, a complex output signal is synchronized and accumulated in a coherent accumulator 105. And, an energy detector 106 detects energy, and the detected energy is later accumulated in a noncoherent accumulator 107. Here, the accumulation procedure and the energy detection procedure are carried out in a branch to measure the intensity of power (energy) of the pilot channel.

In addition, a threshold comparer 110 in a controller 109 compares the accumulated signal in the noncoherent accumulator 107 of the searcher 103 with a threshold, and assigns a finger to an optimum signal path. Each finger 111 & 112 assigned to the optimum signal path by the controller 109 performs a demodulation process.

In short, the receiver in the traditional CDMA communication system searches multipaths using a branch only to measure the intensity of power of the pilot channel. However, it is known that the branch is good only for the forward link having high power for the pilot channel, while the overall performance of the branch is deteriorated in the reverse link having low power for the pilot channel.

Besides, if the data rate of a DPDCH signal is high, the signal intensity of the DPDCH is high. In contrast, if the data rate of the DPDCH signal is relatively low, the signal intensity of the DPDCH gets weak. That is, the signal intensity is proportional to the data rate. Meanwhile, the receiver can find out the data rate only when the TFCI is duly received to 1 frame, which also means that if the data rate is not properly received to the frame, there is no way for the receiver to know the data rate.

Unlike the traditional systems like AMPS or CDMA, the IMT-2000, known as the third generation mobile communication, introduces a new method for searching multipaths, which is not even founded in the current CDMA standards.

SUMMARY OF THE INVENTION

It is, therefore, an object of the present invention to provide a method and apparatus for searching multipaths of a mobile communication system, which enables to find reverse multipaths using a Dedicated Physical Control Channel (DPCH) transmitted from a mobile station in a reverse link of an asynchronous mobile communication system.

In case that a base station is not informed of a spreading factor of a reverse Dedicated Physical Data Channel (DPDCH), another object of the present invention is to provide a method and an apparatus for searching multipaths of a mobile communication system, which enable to find reverse multipaths at a higher speed and to make hand-off rapidly through multiplying a variable number of pilot symbol and a number of the remaining control symbols of the DPDCH by each corresponding weight, respectively.

Still another abject of the present invention is to provide a method and an apparatus for searching multipaths of a mobile communication system, in which a first weight is multiplied to a pilot section in accordance with a variable pilot symbol section, and a second weight is multiplied to another control symbol section, the first weight and the second weight being complementary to each other, and the sum of two weights being 1.

Yet another aspect of the present invention is to provide a method and an apparatus for searching multipaths of a mobile communication system, in which a specific pilot symbol section is multiplied by a weight (Wc1), Pn over {Pn+1} (where Pn is a number of specific pilot symbols of a DPCCH), and the other symbol section is multiplied by another weight (Wc2), 1 over {Pn+1}, the sum of Pn over {Pn +1} and 1 over {Pn+1} being 1.

On the other hand, if a base station is informed of a spreading factor of a reverse Dedicated Physical Data Channel (DPDCH), another object of the present invention is to provide a method and an apparatus for searching multipaths of a mobile communication system, which enable to find reverse multipaths at a higher speed and to make hand-off rapidly through obtaining energy values of a DPCCH and a DPDCH and multiplying the obtained energy values by different variable channel weights, thereby increasing detection probability in result.

Given that a reverse DPDCH's spreading factor, ($SF_k=256/2^k$), is known, yet another object of the present invention is to provide a method and an apparatus for searching multipaths of a mobile communication system, in which a first channel weight (Wc) is {1} over [{256 over SF_k}+1], and a second channel weight (Wd) is {256 over SF_k} over [{256 over SF_k}+1].

To achieve the above objects, there is provided a method for searching multipaths of a mobile communication system, which includes the steps of: performing a coherent detection on a reversed I and Q channel signals of a DPCCH transmitted form a mobile station, multiplying the detected signal by a pilot pattern to accumulate a pilot symbol section in a corresponding section, and performing a coherent accumulation on the other symbol section in a symbol basis; calculating energy value for each coherently accumulated I and Q channel signals; multiplying the calculated energy values by a weight that has been multiplied by the pilot symbol section and another weight that has been multiplied by the other symbol section, respectively; noncoherently accumulating the energy values multiplied by variable weights, and saving the energy values; comparing the saved energy values with a periodically designated threshold; and searching timing information as many as a number of fingers in order of highest energy value according to the comparison result.

Another aspect of the present invention provides an apparatus for searching multipaths of a mobile communication system, which includes: a decimator for performing a decimation process on each channel signal inputted in a predetermined sample at a designated rate; an input buffer for saving every output of the decimator; a complex despreader for dispreading the outputs from the input buffer into complex signals using a scrambling code signal generated by a scramble control signal; a coherent accumulator for coherently accumulating a multiplication of the despread output and a pilot signal on a basis of a pilot symbol section and the other control symbol section; an energy calculator for calculating an energy value of a Dedicated Physical Control Channel (DPCCH) using the coherent accumulation signal; a multiplier for multiplying the pilot section of the DPCCH and the other control symbol section by an appropriate weight, respectively; a noncoherent accumulator for noncoherently accumulating an output of the multiplier; a search result storage for sequentially storing output of the noncoherent accumulator in a form of a search energy value; and a digital signal processor for outputting a control signal to generate the scrambling code, for outputting different weights according to a pilot symbol of the DPCCH, and for periodically storing the search energy value in the search result storage.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore not to be considered limiting of its scope, the invention will be described with additional specificity and detail through use of the accompanying drawings in which:

DETAILED DESCRIPTION OF THE PREFERRED EMBODIMENT

A preferred embodiment of the present invention will now be described with reference to the accompanying drawings. In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
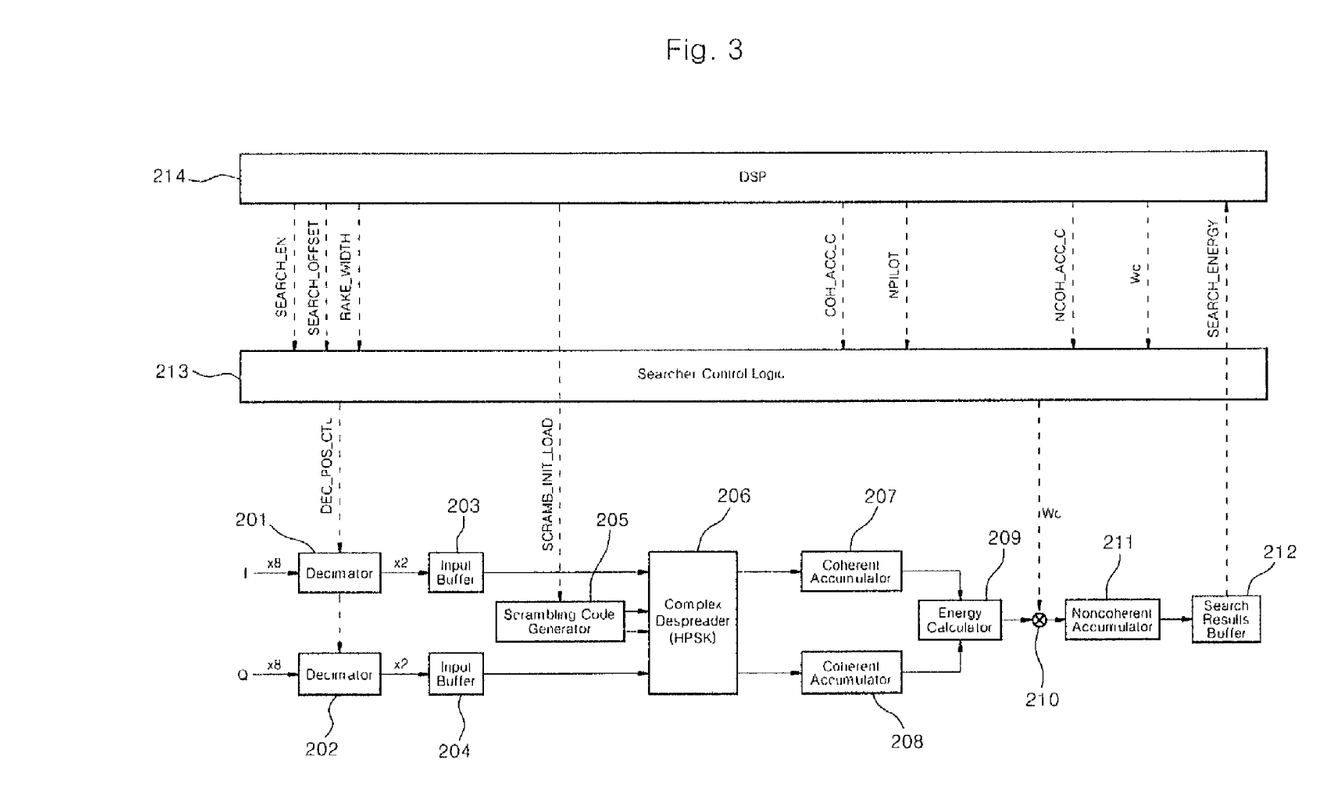
FIG. 3 is a block diagram showing an apparatus for searching multipaths of a mobile communication system in accordance with the present invention.

An apparatus for searching multipaths of a mobile communication system according to a preferred embodiment of the present invention is well depicted in FIG. 3.

As shown in FIG. 3, the searching apparatus of the present invention includes: a decimator 201 & 202 for conducting a decimation process on each inputted channel signal in a form of sample in a designated ratio; an input buffer 203 & 204 for storing an output of the decimator; a scrambling code generator 205 for generating a scrambling code signal according to a scramble code control signal; a complex despreader (HPSK) 206 for despreading the output of the input butter 203 & 204 into a complex signal, according to the scrambling code signal; a coherent accumulator 207 & 208 for multiplying the despread output by a pilot signal, and for coherently accumulating the multiplication in a pilot symbol section unit and in the other symbol section unit; an energy calculator 209 for calculating DPCCH energy values based on the coherent accumulation signal; a multiplier 210 for multiplying a number of pilot symbols of the DPCCH and the other symbols by an appropriate weight, respectively; a noncoherent accumulator 211 for noncoherently accumulating an output of the multiplier; a search result storage 212 for sequentially storing the output of the noncoherent accumulator in the form of energy values; and a digital signal processor (DSP) 214 for outputting weights according to control of each unit and a pilot symbol, and for periodically storing the search energy values stored in the search result storage 212.

The above-described method and the apparatus for searching multipaths of the mobile communication system according to the preferred embodiment of the present invention is now explained with reference to figures.

Figure 4:
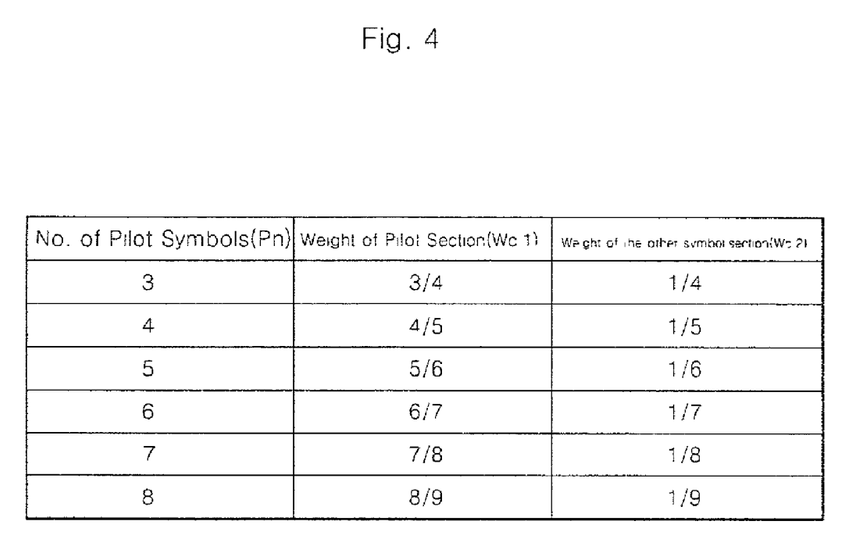
FIG. 4 is an exemplary view showing a ratio of weights according to a number of pilot symbols that is preferably embodied in the present invention.

Referring to FIGS. 3 and 4, the base station searches reverse multipaths using the reverse DPCH received from the mobile station. At this time, if the base station does not know the spreading factor of the mobile station in advance, in other words, the spreading factor of the DPDCH signal, the base station can search multipaths using the DPCCH instead.

In addition, if the data rate of the DPDCH signal is high, the signal intensity is high as well. Similarly, if the data rate of the DPDCH signal is low, the signal intensity is low. That is to say, the signal intensity varies proportionally to the data rate. The receiver can find the data rate only if TFCI is received to 1 frame. Otherwise, there is no way that the receiver knows the data rate. In such case, the DPCCH comes in handy to search multipaths.

Next, searcher control logic 213 conducts search operation under the search enable signal (SEARCH_EN) and the search offset signal (SEARCH OFFSET, starting point of the search) of the digital signal processor 214. The DPCCH signal transmitted from the mobile station passes through the channel, and is filtered out as I channel and Q channel through a receiver filter (Rx Filter). The filtered I or Q channel signal is inputted in each decimator 201 & 202, respectively, in a designated sample form (Chip*8).

Each decimator 201 & 202 undertakes to decimate the channel signal to a designated ratio (chip*2) directed by a decimation position control signal (DEC_POS_CTL) that is outputted from the searcher control logic 213.

The output signal of the decimator 201 is saved in the input buffer 203 & 204, respectively. And, the stored I and Q channel signal is then inputted in the complex despreader 206. The signal inputted in the complex despreader (HPSK: Hybrid Phase Shift Keying despreader) 206 is despread using a scrambling code signal that is generated by the scrambling code generator 205 in which a scrambling code control signal (SCRAMB_INIT_LOAD) of the digital signal processor 214 is inputted.

The coherent accumulator 207 & 208, under the direction of a coherent accumulation signal (COH ACC C) of the digital signal processor 214, multiplies the despread signal by a pilot signal (NPILOT), and integrates the whole pilot symbol section for coherent accumulation (i.e., 256Chip*$N_{pilot}$), and also integrates the other control symbol section by the symbol unit (i.e., 256Chip) for coherent accumulation.

The energy calculator 209 squares the output result of the coherent accumulator 207 & 208 to calculate energy ($I^2$, $Q^2$). The calculated I and Q channel signals are summed up together ($I^2+Q^2$), and the sum is inputted in the multiplier. The multiplier 210 multiplies the pilot symbol section of the DPCCH and the other unit symbol section by different weights (Wc: Wc1, Wc2) according to the pilot symbol section, having been outputted from the digital signal processor 210, respectively.

Here, the number of the DPCCH pilot symbols is a variable section from 3 through 8, and it is arbitrarily selected. Supposing that the energy detectibility of the pilot section and the other section is different from each other, and that the intensity (or power) of the pilot symbol and the other control symbol is the same, the detection probability is considerably higher as the number of pilot symbols increases. This is true especially when the speed of the mobile station is low.

FIG. 4 illustrates weight ratios according to the number of pilot symbols. As shown in FIG. 4, each pilot section according to the number of pilot symbols is multiplied by a first weight (Wc1; 3/4, 4/5, 5/6, 6/7, 7/8, 8/9) to be adjusted, and similarly, the other control symbol section is multiplied by a second weight (Wc2; 1/4, 1/5, 1/6, 1/7, 1/8, 1/9) to be adjusted. At this time, the sum of the first weight (Wc1) for the pilot section and the second weight (Wc2) for the other section is 1.

In addition, the multiplication of the weight is repeated using a designated window size.

Suppose that the number of specific pilot symbols is Pn, then the weight (Wc1) for the pilot section is Pn over {Pn+1}, and the weight (Wc2) for the other section is 1 over {Pn+1}, wherein the sum of two weights is 1, thereby complementing each other. For example, if the number of pilot symbols is 3, then the first weight (Wc1) will be 3/4, and the other weight (Wc2) will be 1/4. Again, if the number of pilot symbols is 4, then the first weight (Wc1) will be 4/5, and the other weight (Wc2) will be 1/5. Similarly, if the number of pilot symbols is 5, 6, 7 or 8, the first weight to be multiplied will be 5/6, 6/7, 7/8, or 8/9 in order, and the second weight to be multiplied will be 1/6, 1/7, 1/8 or 1/9, respectively.

The noncoherent accumulator 211 noncoherently accumulates the entire pilot, or the multiplication of the weight and the pilot symbol, together with the other symbol, directed by a noncoherent accumulation control signal (NCOH_ACC_C) of the digital signal processor 214. Then the accumulated value is sequentially stored in the result search storage 212 in the form of a search energy value.

The digital signal processor 204 reads the search energy (SEARCH ENERGY) including the search energy value saved in the search result storage 212 periodically, and saves the energy in the internal buffer. At this time, the digital signal processor 214 also compares the search energy value saved in the internal buffer with the designated threshold. If the search energy value turns out to be greater than the threshold, the digital signal processor 214 inputs the search energy value in a sort block. The search energy value inputted in the sort block is then able to find timing information, that is offset from the window starting point, in order of high to low energy value as many as fingers.

Figure 5:
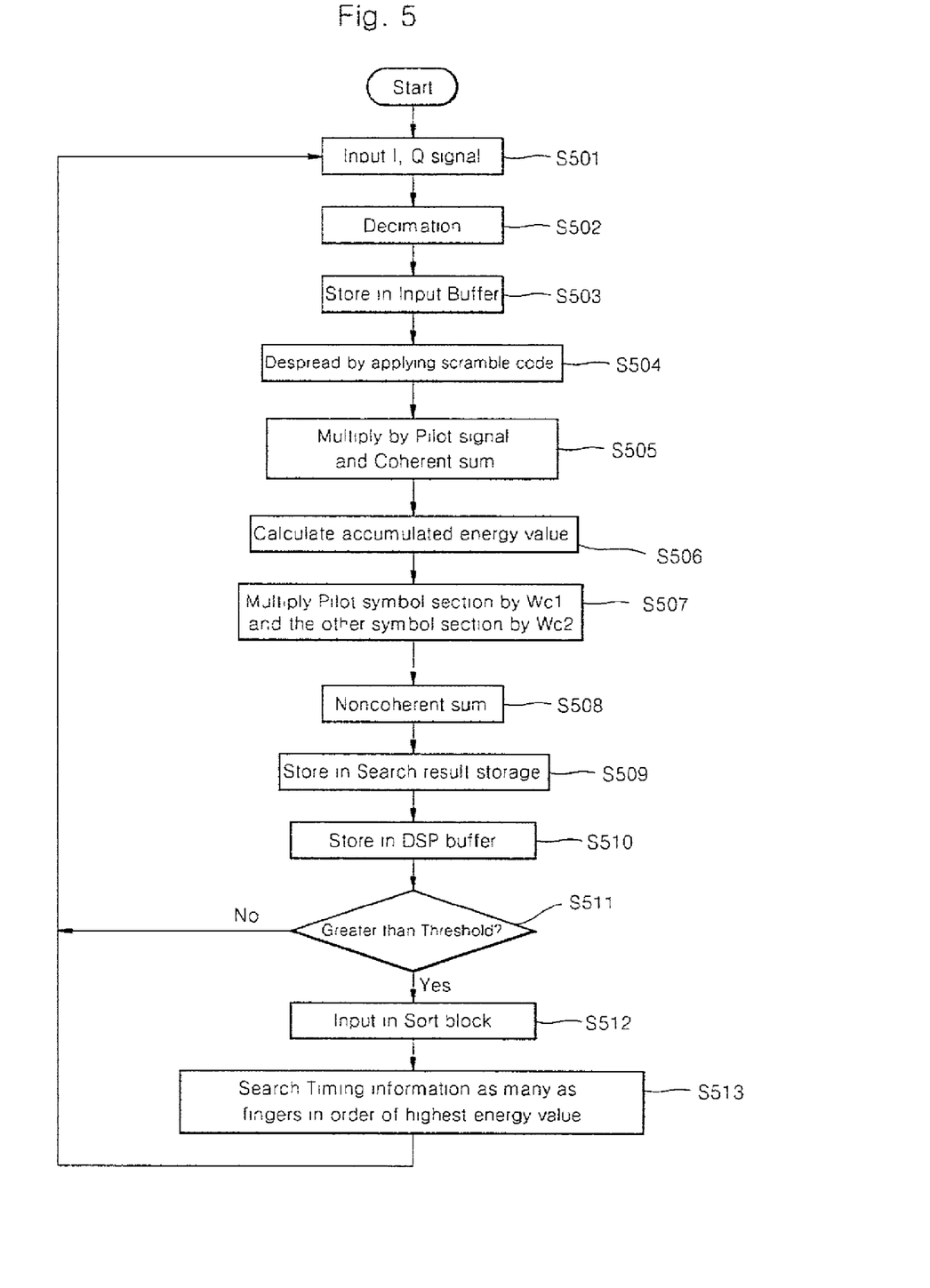
FIG. 5 is a flow chart showing a method for searching multipaths of a mobile communication system in accordance with a preferred embodiment of the present invention.

FIG. 5 is a flow chart illustrating the method for searching multipaths of the mobile communication system in accordance with the preferred embodiment of the present invention.

Referring to FIG. 5, the DPCCH signal that passed through the mobile station's channel is inputted in the form of I channel and Q channel at the receiving filter (Rx Filter) (S501). The filtered I and Q channel signals are inputted in the decimator in the form of the designated sample (e.g., Chip*8), and the decimator, following the decimation position control signal (DEC_POS_CTL), outputted from the searcher control logic 214, decimates the sample to a certain ratio (e.g., Chip*2) (S502).

The decimated I and Q channel signals are saved in each input buffer, respectively (S503), and afterwards, they are inputted in the complex despreader 206. Here, the scrambling code generator 205 outputs the scrambling code signal to the complex despreader 206, directed by the scramble code control signal (SCRAMB_INT_LOAD) of the digital signal processor 214. Then, the complex despreader 206 despreads the I and Q channel signals using a scrambling code signal (S504).

Later, the despread scrambling code signal is multiplied by a pilot pattern at the coherent accumulator 207 & 208, and the pilot symbol section multiplied by the pilot pattern is coherently accumulated up to the pilot symbol, while the other section is coherently accumulated in the symbol unit (S505).

Once the coherent accumulation value in the pilot symbol section and the other section is respectively obtained, the energy calculator 209 calculates an energy value for each (S506), which is later added upon the I and Q channel before they are outputted. In the meantime, the multiplier 210 multiplies the calculated energy values for the pilot symbol section of the DPCCH and the other symbol section by the variable weight (Wc1 or Wc2), respectively (S507).

In other words, since the number of pilot symbols of the DPCCH generally has variable sections ranging from 3 through 8 a different weight for each variable section should be multiplied by the pilot section and the other symbol section, respectively. In this way, as the pilot energy gets higher, the detection probability gets higher as well. That is to say, when the mobile station's speed is low, the number of pilot symbols is proportional to the detection probability, given that the energy detectability of the pilot section and of the other section is different from each other and that the symbol intensity (or power) for the pilot and the other control symbol is the same.

The pilot symbol of the DPCCH and the other symbol, both having been multiplied by the weight at the step of 507, are then stored in the search result storage 212 in the form of the search energy value (S508 & S509). Here, the steps of 507, 508 and 509 are repeated based on the hypothesis that is as large as the window size.

The search energy values saved in the search result storage are periodically stored in the internal buffer of the digital signal processor 214, where they are compared with the threshold (S5111), and the energy value greater than the threshold is inputted in the sort block (S512). The search energy value inputted in the sort block then searched the timing information (offset from the window starting point) in order of high to low energy value as many as the fingers (S513).

The above-described embodiment increases the detection probability by applying different multiplication of weights according to the number of pilot symbols to the pilot section and the other section, especially when the base station does not know the spreading factor of the DPDCH. Also, the embodiment enables to search multipaths and handoff more quickly. Among others, especially the digital signal processor 214 outputs every kind of control signal to the searcher control logic 213, thereby enabling the search operation of the system in overall.

Therefore, although the base station is not aware of the spreading factor of the DPDCH, it is possible to search multipaths even at a higher speed by finding the total energy, which is actually accomplished by multiplying the pilot symbol section of the DPCCH and the other symbol section by different weights.

Figure 6:
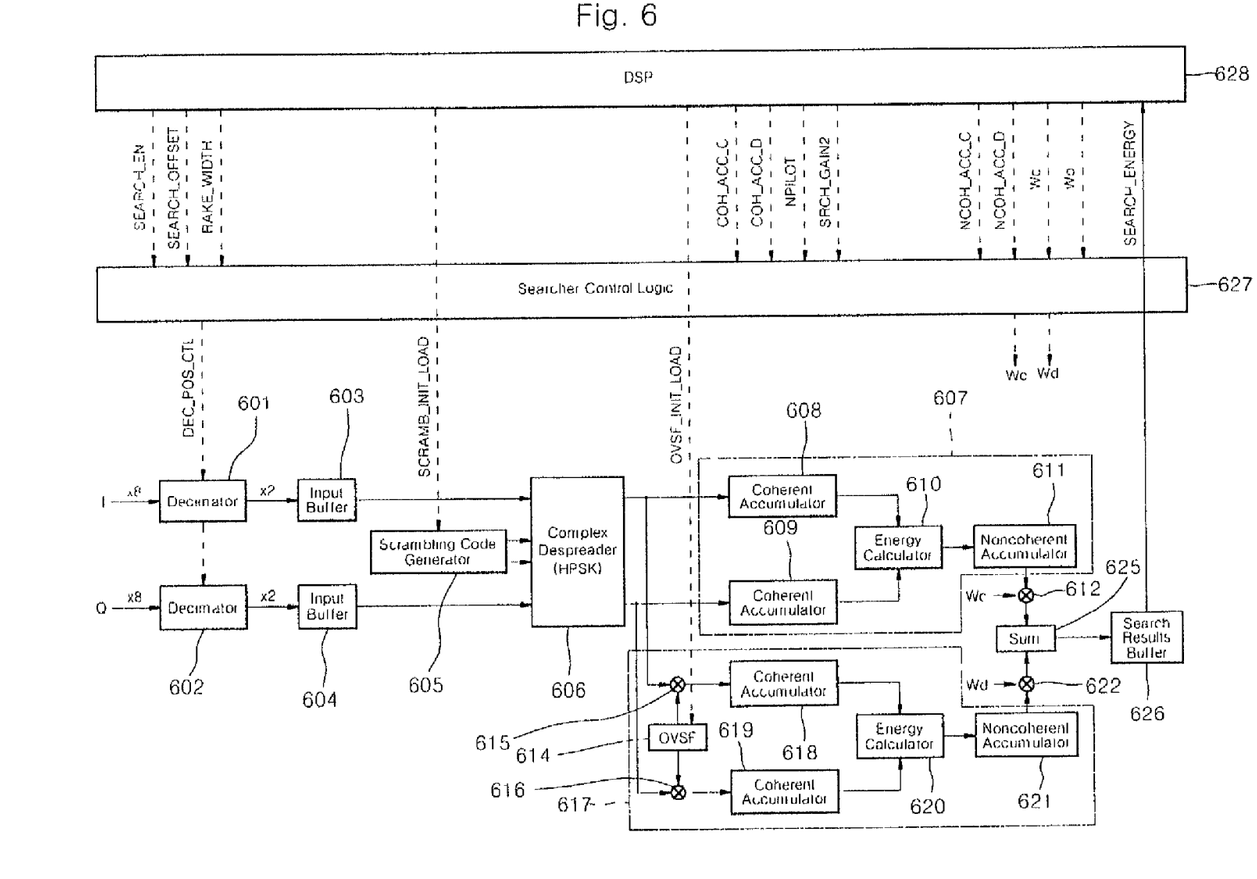
FIG. 6 is a block diagram showing an apparatus for searching multipaths of a mobile communication system in accordance with another preferred embodiment of the present invention.

FIG. 6 is a block diagram illustrating an apparatus for searching multipaths of the mobile communication system in accordance with another embodiment of the present invention.

With reference to FIG. 6, the apparatus includes: a decimator 601 & 602 for decimating each inputted channel signal in the form of the designated sample at the designated ratio; an input buffer 603 & 604 for storing output of the decimator; a scrambling code generator 605 for generating a scrambling code signal under the direction of a scrambling code control signal; a complex despreader (HPSK) 606 for despreading the output of the input buffer 603 & 604 to a complex signal under the direction of the scrambling code control signal; a first channel energy searcher 607 for searching a first channel (DPCCH) energy by multiplying the despread output by a pilot signal and coherently accumulating the multiplication output; a second channel energy searcher 617 for searching a second channel (DPDCH) energy by calculating energy of the sum of output of the complex despreader 606 with each coherent accumulation that is dechannelized under an orthogonal variable spreading factor (OVSF), and by coherently accumulating the calculated energy; a first multiplier 612 for multiplying the output of the noncoherent accumulation of the first channel energy searcher 607 by a first channel weight; a second multiplier 622 for multiplying the noncoherently accumulated second channel energy of the second channel energy searcher 617 by a second channel weight; an adder 625 for adding up the output of the first multiplier 612 and the output of the second multiplier 622; a search result storage 626 for storing a total value of the adder; a searcher control logic 627 for controlling each unit's channel searching operation; a digital signal processor 628 for outputting &different channel weight according to each unit's control and a spreading factor of a DPDCH, and for sequentially storing a channel energy search result saved in the search result storage 626.

The first channel energy searcher 607 preferably includes first and second coherent accumulators 608 & 609 for multiplying each despread signal by the complex despreader 606 by the pilot signal, and for accumulating the multiplication output up to the entire pilot symbol section; a first energy calculator 610 for calculating DPCCH energy out of the coherent accumulation signal of the first and the second coherent accumulators 608 & 609; and a first noncoherent accumulator 611 for noncoherently accumulating output of the energy calculator 610.

On the other hand, the second energy searcher 617 preferably includes third and fourth multipliers 615 & 616 for dechannelizing by multiplying each despread signal by the complex despreader 606 by the orthogonal variable spreading factor (OVSF) code 614 to distinguish channels; third and fourth coherent accumulators 618 & 619 for coherently accumulating output of the third and the fourth multipliers 615 & 616, respectively; a second energy calculator 620 for calculating DPDCH energy out of the coherent accumulation signal; and a second noncoherent accumulator 621 for noncoherently accumulating output of the energy calculator 620.

Still another method and an apparatus for searching multipaths of the mobile communication system according to another embodiment of the present invention is now explained with reference to the figures.

First of all, the digital signal processor 628 sends out a multipath search enable signal (SEARCH EN) to the searcher control logic 627, and outputs a search offset signal (SEARCH OFFSET).

At this time, the DPCH signal transmitted form the mobile station is filtered off through the receiving filter (Rx Filter) into an I channel and Q channel. And, the filtered I channel and Q channel is respectively inputted in the decimator 601 & 602 separately in the form of the designated sample (Chip*8).

The decimator 601 & 602, under the direction of the decimation position control signal (DEC POS CTL) of the searcher control logic 627, decimates the I channel and Q channel to the designated ratio (chip*2).

The output of each decimator 602 & 602 is then saved in the input buffer 603 & 604, respectively. The saved I and Q channel signals are later inputted in the complex despreader 606. At this time, the function of the complex despreader 606 is to despread the channel signals to the scrambling code signal that is generated from the scrambling code generator 605 in which the control signal (SCRAMB_INIT_LOAD) of the digital signal processor 628 is inputted.

The despread channel signals by the complex despreader 606 are inputted in the first channel energy searcher 607 and the second channel energy searcher 617, respectively. In result, the inputted channel signal undergoes coherent accumulation, energy calculation, and noncoherent accumulation, and then, the first channel (DPCCH) energy, and the second channel (DPDCH) energy are respectively detected.

To this end, the first channel energy searcher 607 includes the first and the second coherent accumulators 608 & 608, the first energy calculator 610, and the first noncoherent accumulator 611. Here, the first and the second coherent accumulators 608 & 609 are directed under the control signal (COH_ACC_C) of the digital signal processor 628, and multiplies the pilot signal (NPILOT) by each channel signal that has been despread by the comples despreader before coherently accumulating the multiplication output.

The first energy calculator 610 calculates each energy value out of the coherent accumulation output of the first and the second coherent accumulators 607 & 609, and sums up the energy values, i.e., $I_2+Q^2$, and then outputs the result. In addition, the first noncoherently accumulator 611 noncoherently accumulates the output of the first energy calculator 610 according to the noncoherent accumulation control signal (NCOH_ACC_C). In other words, the pilot symbol section of the DPCCH and the other section's unit symbol section are noncoherently accumulated, which is later used for searching the DPCCH's energy.

The second channel energy searcher 617 includes the third and the fourth multipliers 615 & 616 for dechannelizing; the second energy calculator 620; and the second noncoherent accumulator 621. Here, the third and the fourth multipliers 615 & 616, in which the complex output signal of each channel from the complex despreader 606 is inputted, first multiplies the inputted complex despread signals by the OVSF 614 for distinguishing the channels, under the direction of the signal (OVSF_INIT_LOAD) sent out by the digital signal processor 628, respectively, and performs the dechannelization process on each.

Upon receiving the output of the third and the fourth multipliers 615 & 616, the third and the fourth coherent accumulators 618 & 619 integrate the outputs and coherently accumulate them separately, which is done according to the coherent accumulation control signal (COH_ACC_D) of the digital signal processor 628. At this time, the third and the fourth coherent accumulators 618 & 619 check the DPDCH's spreading factor, and coherently accumulate the channel signals as much as the spreading factor size.

In the meantime, the second energy calculator 620 squares each energy value obtained from the third and the fourth coherent accumulators 618 & 619 by way of getting the energy value with a bigger absolute value, and outputs the calculation result of each energy values, such as, the sum of the square of each energy value ($I^2+Q^2$). The output of the second energy calculator 620 is then noncoherently accumulated in the second noncoherent accumulator 621, which consequently searches the second channel (DPDCH) energy.

The first multiplier 612 multiplies the first channel (DPCCH) energy that has been accumulated in the noncoherent accumulator 612 of the first channel energy searcher 607 by the first channel (DPCCH)'s weight (Wc) that is outputted from the digital signal processor 628, and outputs the result. Similarly, the second multiplier 622 multiplies the second channel (DPDCH) energy that has been noncoherently accumulated in the second channel energy searcher 617 by the second channel (DPDCH)'s weight (Wd) that is again outputted from the digital signal processor 628, and outputs the result. The channel energy values having been multiplied by the channel weights through the first and the second multipliers 612 & 622 are summed up together through the adder 625 to make up the total energy, and is finally saved in the search result storage 626.

Here, the base station knows the spreading factor before the factor from a high rank control station is call setup. Actually, the spreading factor plays a key role in searching signals. Generally, if the data rate of the mobile station is high, the spreading factor of the DPDCH is low, while if the data rate of the mobile station is low, the spreading factor of the DPDCH is high.

In many cases, the spreading factor of the DPCCH is fixed to 256. But the spreading factor of the DPDCH varies, ranging from 4 through 256. Thus, given that the power ratio between the DPCCH and the DPDCH is the same, the greater spread factor of the DPDCH is, the higher the detection probability is.

Figure 7:
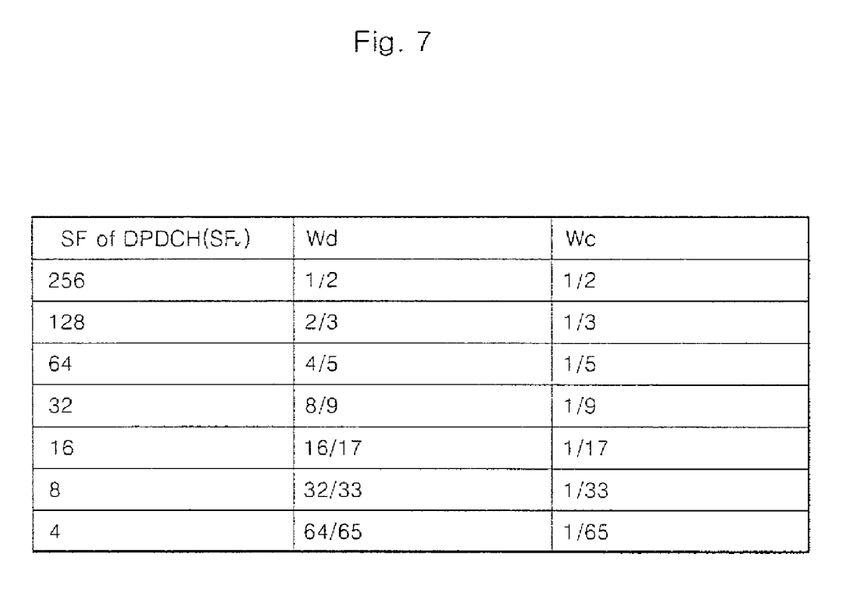
FIG. 7 diagramatically shows a ratio of channel weights for a Dedicated Physical Data Channel (DPDCH) and a Dedicated Physical Control Channel (DPCCH) according to a spreading factor of the DPDCH in accordance with another preferred embodiment of the present invention.

The ratio of the first channel weights (Wc) outputted from the digital signal processor 628 to be multiplied by the total energy of the DPCCH, and the second channel weights (Wd) to be multiplied by the total energy of the DPDCH is shown in FIG. 7. As well manifested in FIG. 7, supposing that the power ratio of the DPCCH and the DPDCH is the same, the greater spread factor results in higher detection probability. This is so because the DIDCH's spreading factor varies from 4 through 256, while the DICCH's spreading factor is fixed to 256.

For instance, if the spreading factor of the DPDCH is 256, the first channel weight (Wc) will be 1/2, and the second channel weight (Wd) will be 1/2. As another example, if the spreading factor of the DPDCH is 128, the first channel weight (Wc) will be 1/3, and the second channel weight (Wd) will be 3/2. Similarly, if the spreading factors of the DPDCH are 64, 32, 8, and 4, the first channel weights (Wc) will be 1/5, 1/9, 1/33, and 1/65, and the second channel weights (Wd) will be 4/5, 8/9, 32/33, and 64/65.

In more detail, the relation between the spreading factor and the variable for determining a bit number per upper link DPDCH slot can be summarized to $SF_k=256/2^k$, wherein k ranges from 0 through 6. Thus, if k is 0, the spreading factor is 256 ($SF_{k=0}$), and if k is 1, the spreading factor is 128 ($SF_{k=1}$), . . . , and if k is 6, the spreading factor is 4 ($SF_{k=6}$) and so forth.

Meantime, the first channel weight (Wc) for each spreading factor ($SF_k$) is any value satisfying the formula, {1} over [{256 $SF_k$}+1], and the second channel weight (Wd) is any value satisfying the formula, {256 over $SF_k$} over [{256 over $SF_k$}+1]. Here, $SF_k$ takes one of 256, 128, 64, 32, 16 and 4 (k=0~6).

Applying the above, if the spreading factor of the DPDCH is 256, $SF_k$ (k=0) is 256, meaning that the first channel weight (Wc) is 1/2, and the second channel weight (Wd) is 1/2. Similarly, if the spreading factor of the DPDCH is 128, $SF_k$ (k=1) is 128, meaning that the first channel weight (Wc) is 1/3, and the second channel weight (Wd) is 2/3. In this way, every channel weight for each spreading factor can be calculated as shown in FIG. 7.

In short, as the spreading factor of the DPDCH gets larger, the first channel weight (Wc) to be multiplied by the DPCCH gets smaller, while the second channel weight (Wd) to be multiplied by the DPDCH gets larger. Similar to before, the first channel weight (Wc) and the second channel weight (Wd) vary depending on the spreading factor and are a complement to each other, and the sum of the two weights is 1.

Also, the multiplication of the weight is repeated as often as the designated hypothesis to the window size.

As explained before, the signals that have been multiplied by different channel weights at the first and the second multipliers 612 & 622 are added together at the adder 625, and the result is stored in the search result storage 626.

The search result storage 626, on the other hand, periodically saves the search energy values in the internal buffer of the digital signal processor 628. The value saved in the digital signal processor 628 is then compared with the threshold, and if it turns out that the energy value is greater than the threshold, it is inputted in the sort block for searching timing information (offset from the window staring point) in order of high to low energy value as many as fingers.

Therefore, the first channel weight (Wc) and the second channel weight (Wd) based on the spreading factor as shown in FIG. 7 are multiplied by the outputs of the noncoherent accumulators of the DPCCH and the DPDCH, respectively. And, the sum of the multiplication output is periodically inputted in the digital signal processor. Later, the total search energy is compared with the threshold, and the energy value greater than the threshold is inputted in the sort block, which is used for searching timing information in order of high to low energy value as many as fingers, and eventually for searching multipaths more quickly.

Figure 8:
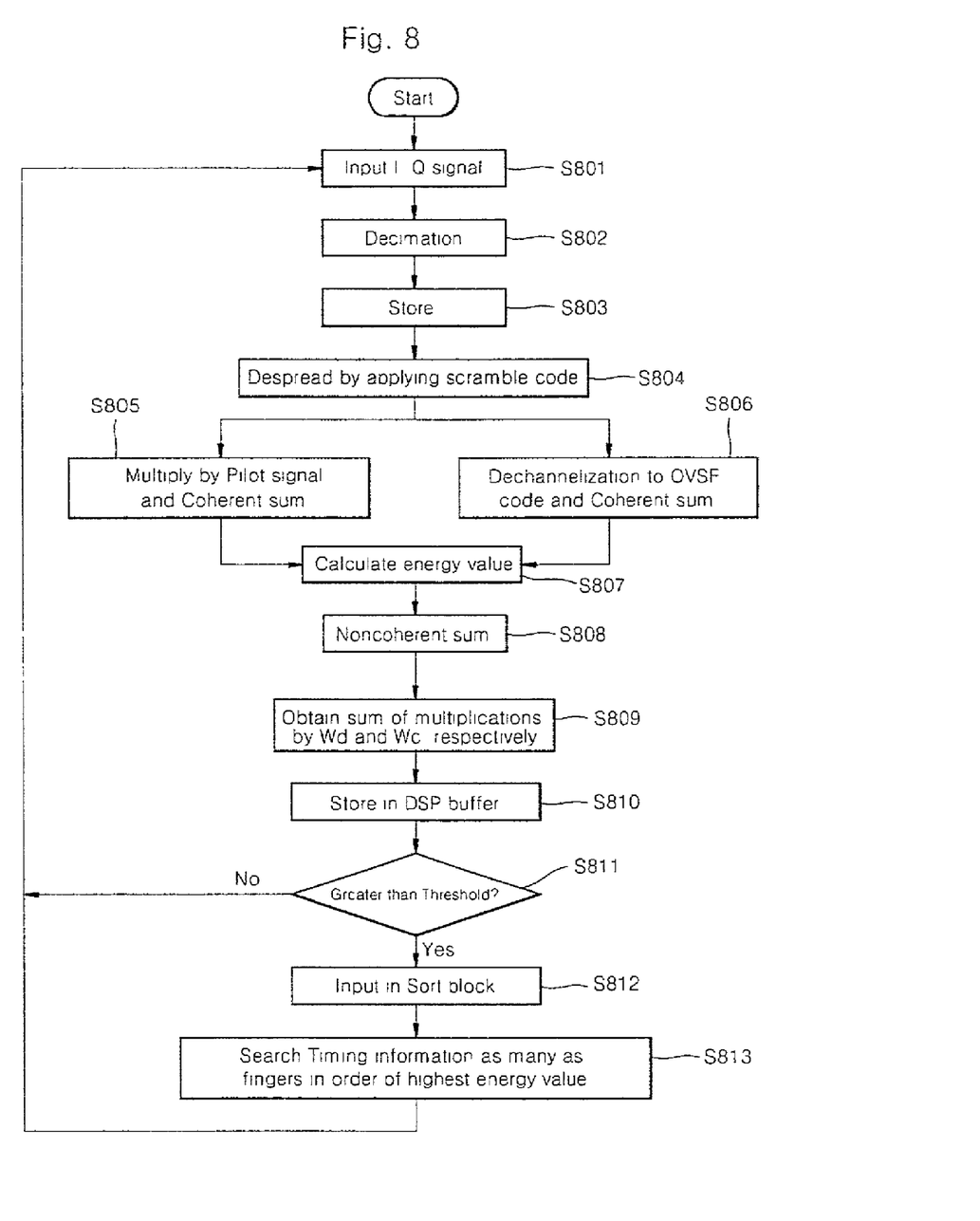
FIG. 8 is a flow chart showing a method for searching multipaths in a mobile communication system in accordance with another preferred embodiment of the present invention.

FIG. 8 is a flow chart illustrating the method for searching multipaths of the mobile communication system in accordance with a different embodiment of the present invention.

Referring to FIG. 8, the DPCH transmitted from the mobile station passes through the channel, and the receiving filter of the receiver, and then the channel is inputted in the receiving filter in the form of I or Q channel (S801).

The outputted I and Q channel signals are inputted in the decimator in the form of chip*8, and the decimator is provided with the decimation staring position by the decimation position control signal (DEC_POS_CTL), and then decimates the I and Q channel signal to the designated ratio (S802).

Each decimated signal to the designated ratio (Chip*2) at the decimator 601 & 602 is saved in each input buffer 603 & 604 (S803), and the I and Q channels saved in the input buffer 603 & 604 are inputted in the complex despreader 606, in which they are despread to the scrambling code to be spread out (S804).

Next, the output of the complex despreader 606 is inputted in the first channel energy searcher 607 and the second channel energy searcher 617, respectively. In the first channel energy searcher 607, the output is multiplied by the pilot and coherently accumulated, which is later used for searching the DPCCH energy. On the other hand, in the second channel energy searcher 617, the output is dechannelized using the OVSF code 614 and coherently accumulated, which is later used for searching the DPDCH energy (S805, S806, and S807).

Here, the first through the fourth coherent accumulators 608, 609, 618 & 619 of the first channel energy searcher 607 and the second channel energy searcher 617 integrate incomplete input signals to complete them, and coherently accumulate the input signals, under the direction of the coherent accumulation control signals (COH_ACC_C, COH_ACC_D) (S805 & S806). And, the first and the second energy calculators 610 & 620 square the output of the coherent accumulation and calculate each energy for the purpose of finding the energy value with a greater absolute value (S807). The first and the second noncoherent accumulators 611 & 621 noncoherently accumulate the energy outputs by way of improving the credibility of the energy output, under the direction of the noncoherent cumulation control signals (NCOH_ACC_C, NCOH_ACC_D) (S808).

Next, the noncoherently accumulated energy values are multiplied by the channel weight, Wd or Wc, respectively, and the sum of the multiplication outputs is save in the search result storage 626. This procedure is repeated as many as the arbitrarily designated frequency to the window size, and the search energy values saved in the search result storage 626 are periodically save in the buffer of the digital signal processor 628 (S809, S810, & S811).

In addition, the search energy values saved in the search result storage 626 are compared with the threshold value save in the digital signal processor 628. Only the total search energy value greater than the threshold is inputted in the sort block (S812 & S813). The sort block searches timing information (offset from the window starting point) in order of high to low every value as many as fingers (S814).

As explained so far, the present invention provides more effective method for searching multipaths of the mobile communication system by multiplying the noncoherent accumulator outputs by different weights to an appropriate ratio, in consideration of different reliability of the signals of the DPDCH and the DPCCH because of the proportional relation between the spreading factor and the cycle detection probability, and the step-by-step signal processing pattern for searching multipaths.

Besides, the present invention also introduced the method for searching multipaths, in case that the base station does not know the spreading factor of the reverse DPDCH transmitted from the mobile station, by multiplying the pilot symbol section of the DPCCH and the other control symbol section by different weights, respectively ($1^{st}$ searching step). Also, in case that the base station already knows the spreading factor of the DPDCH transmitted from the mobile station, the multipaths are searched out by multiplying the search energy of the DPDCH and the DPDCH by the corresponding channel weight to the spreading factor ($2^{nd}$ searching step). In short, the base station, whether or not it knows the spreading factor of the mobile station, can search multipaths of the mobile station by selectively applying the weights.

Further, the energy of the DPDCH and the DPCCH transmitted from the mobile station is detected, respectively. Depending on the ratio of detected energy values from each channel (DPDCH, DPCCH), different weights are multiplied to search the multipaths of the mobile station.

In conclusion, the method and the apparatus for searching multipaths of the mobile communication system according to the present invention are very effective especially when the base station does not know the spreading factor of the DPDCH, yet it needs to search multipaths of the multipaths of the reverse link in the asynchronous JMT-2000. To this end, the pilot section of the DPCCH and the other control symbol section are multiplied by different weights that are variable depending on the number of the pilot symbols and the number of the other control symbols, thereby increasing the detection probability and searching multipaths more quickly. In doing so, the channel quality with information is greatly enhanced and the handoff can be speedily conducted.

Meanwhile, if the base station knows the spreading factor of the mobile station in advance, different weights (e.g., Wc or Wd) that depend on the spreading factor are multiplied by the search energy value of the DPDCH and the DPCCH, respectively, which again facilitates searching multipaths based on the total energy and doing handoff very fast.

To be short, the present invention, whether the base station is aware of the spreading factor of the DPDCH or not, enables to search multipaths by selectively applying the above-described methods.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A method for searching multipaths of a mobile communication system, the method comprising:
receiving respective inphase (I) and quadrature (Q) channel signals of a Dedicated Physical Control Channel (DPCCH) transmitted from a remote mobile station, the I and Q channel signals include symbol information and other control information;
dispreading said I and Q channel signals to generate despread I and Q Channel signals;
multiplying the despread I and Q signals by a pilot pattern to coherently accumulate the pilot information and coherently accumulate the other control information of each of said despread I and Q channel signals, respectively, to obtain respective coherently accumulated I and Q channel signals;
calculating energy values for each of the coherently accumulated I and Q channel signals to obtain calculated energy values corresponding to the pilot information and other information;
multiplying the calculated energy values corresponding to the pilot information by a variable weight and multiplying the calculated energy values corresponding to the other information by another variable weight, respectively;
noncoherently accumulating the energy values multiplied by variable weights and storing the energy values;
comparing the stored energy values with a periodically designated threshold to generate a comparison result; and
searching timing information in a number of fingers of said communication system in order of highest to lowest energy values according to the comparison result.

2. The method of claim 1, wherein a number of the pilot information of the DPCCH is multiplied by a first weight corresponding to the pilot information, and by a second weight corresponding to the other information.

3. The method of claim 2, wherein the number of the pilot information of the DPCCH is variable, being arbitrarily selected from 3 through 8.

4. The method of claim 2, wherein the weight corresponding to the pilot information is Pn/(Pn+1) and the weight corresponding to the other information is 1/(Pn+1), in which Pn is the number of the pilot information of the DPCCH.

5. The method of claim 2, wherein the first weight to be multiplied by the pilot information of the DPCCH, and the second weight to be multiplied by the other information of the DPCCH complement each other, and the sum of the two weights is 1.

6. The method of claim 1, wherein the method is repeated as many times as a designated hypothesis of a window size for multiplying the number of the pilot information and the other information of the DPCCH by variable weights.

7. An apparatus for searching multipaths of a mobile communication system, comprising:
first and second decimators for performing a decimation process on first and second channel signals inputted respectively in a predetermined sample rate, each channel signal comprising an inphase (I) signal and a quadrature (Q) signal, each of said inphase signal and said quadrature signal includes pilot information and other control information;
first and second input buffers for storing outputs of the first and second decimators, respectively;
a complex despreader for dispreading a respective output of the first and second input buffers into despread inphase and quadrature signals using scrambling code signal generated based on a scramble control signal;
a first coherent accumulator for multiplying the despread inphase signal by a pilot signal and coherently accumulating the despread I signal including the pilot information and the other information, to generate a first coherent accumulation signal;

a second coherent accumulator for multiplying the despread quadrature signal by said pilot signal and coherently accumulating the despread Q signal including the pilot information and the other information, to generate a second coherent accumulation signal;

an energy calculator for calculating an energy value of a Dedicated Physical Control Channel (DPCCH) using the first and second coherent accumulation signals from the first and second coherent accumulators;

a multiplier for multiplying the pilot information and the other information of the energy value of DPCCH by a respective weight;

a noncoherent accumulator for noncoherently accumulating an output of the multiplier;

a search result storage for sequentially storing an output of the noncoherent accumulator in a sequence relative to the energy value; and a digital signal processor for outputting a control signal to generate the scrambling code, for outputting said respective weights according to the information of the DPCCH, and for periodically storing the energy value in an internal buffer of said DSP.

8. The apparatus of claim 7, wherein the first and second coherent accumulators each accumulates the pilot information of the DPCCH, and coherently accumulates the other control information of the DPCCH, respectively.

9. The apparatus of claim 7, wherein a number of the pilot information of the DPCCH is variable, being arbitrarily selected from 3 through 8.

10. The apparatus of claim 7, wherein the multiplier multiplies the pilot information of the DPCCH by a first weight transmitted from the digital signal processor, and the other information by a second weight transmitted from the digital signal processor.

11. The apparatus of claim 7, wherein the weight corresponding to the pilot information is Pn/(Pn+1), and the weight corresponding to the other information is 1/(Pn+1), in which Pn is the number of the pilot information of the DPCCH.

12. The apparatus of claim 7, wherein the multiplier multiplies the pilot information of the DPCCH by a first weight, and the other information by a second weight, the two weights being complements to each other and the sum of the two weights being 1.

13. A method for searching multipaths of a mobile communication system, the method comprising:

receiving respective inphase (I) and quadrature (Q) channel signals of a Dedicated Physical Channel (DPCH) transmitted from a remote mobile station, the DPCH includes a Dedicated Physical Control Channel (DPCCH) and a Dedicated Physical Data Control Channel (DPDCH);

decimating the I and Q channel signals to generate respective decimated I and decimated Q channel signals, storing the decimated I and Q channel signals in a first and second input buffers, respectively, and despreading the decimated I and decimated Q channel signals from the first and second input buffers using a scrambling code signal to generate despread I and Q channel signals;

calculating an energy value of said Dedicated Physical Control Channel (DPCCH) by multiplying the despread I and Q channel signals by a pilot pattern to generate multiplication outputs, coherently accumulating the multiplication outputs into first accumulated outputs, and calculating the energy value of the DPCCH from the first accumulated outputs;

calculating an energy value of the Dedicated Physical Data Control Channel (DPDCH) by dechannelizing the despread I and Q channel signals using an orthogonal variable spreading factor (OVSF) to generate dechannelized despread I and Q channel signals and coherently accumulating the dechannelized channel signals into second accumulated outputs, and calculating the energy value of said DPDCH from the second accumulated outputs;

noncoherently accumulating the energy values of the DPCCH and the DPDCH and multiplying each energy value by a different weight according to a spreading factor of the DPDCH;

adding the channel energy values multiplied by said different channel weights together, sequentially storing the sum and periodically comparing the stored channel energy values with a designated threshold; and sending out a channel energy value greater than the threshold to a sort block, and searching timing information in order of high to low energy values, the number of channel energy being equal to a number of fingers in said mobile communication system.

14. The method of claim 13, wherein the channel weights comprises a first channel weight corresponding to a spreading factor of the DPCCH and a second channel weight corresponding to a spreading factor of the DPDCH.

15. The method of claim 13, wherein if the spreading factor ($SF_k$) of the DPDCH varies from 4 through 256, and the spreading factor ($SF_k$)=$256(2^k)$, where k ranges from 0 to 6, then the first channel weight (Wc) corresponding to the spreading factor ($SF_k$) of the DPDCH is $1/((256/SF_k)+1)$, and the second channel weight (Wd) is $(256/SF_k)/((256/SF_k)+1)$.

16. The method of claim 13, wherein the first weight to be multiplied by the energy value of the DPCCH, and the second weight to be multiplied by the energy of the DPDCH complement each other, and the sum of the two weights is 1.

17. An apparatus for searching multipaths of a mobile communication system, comprising:

an input for receiving a Dedicated Physical Channel (DPCH) signal from a remote mobile station, for filtering off the signal, and generating inphase (I) and quadrature (Q) channel signals, said signal includes a Dedicated Physical Control Channel signal (DPCCH) and a Dedicated Physical Control Data Channel signal (DPDCH);

first and second decimators for receiving and decimating I and Q channel signals at a designated ratio, respectively, the signals being inputted at a predetermined sample rate;

first and second input buffers for storing an output of each of the first and second decimators, respectively;

a complex despreader for despreading the decimated I and Q channel signals stored in the first and second input buffers using a scrambling code signal generated based on the scrambling code control signal to generate despread I and Q channel signals;

a first channel energy searcher for searching a first channel Dedicated Physical Control Channel (DPCCH) energy by multiplying the despread I and Q channel signals, respectively by a pilot signal and coherently accumulating respective multiplication output to calculate an energy and by noncoherently accumulating the calculated energy;

a second channel energy searcher for searching a second channel Dedicated Physical Control Data Channel (DPDCH) energy by dechannelizing the despread I and Q channel signals using an orthogonal variable spreading factor (OVSF), respectively, to generate dechannelized I and Q channel signals, by coherently accumulating the dechannelized I and Q channel signals, to calculate an energy, and by noncoherently accumulating the calculated energy;

a first multiplier for multiplying the calculated energy of the noncoherent accumulation of the first channel energy searcher by a first channel weight;

a second multiplier for multiplying the calculated energy of the noncoherently accumulation of the second channel energy searcher by a second channel weight;

an adder for adding up an output of the first multiplier and an output of the second multiplier;

a search result storage for storing an output value of the adder; and a digital signal processor (DSP) for outputting the first and second channel weights according to a spreading factor of the DPDCH, for storing the search energy values saved in the search result storage to a memory of the DSP, for comparing the stored search value with a threshold, and if the search energy value is greater than the threshold, searching for timing information in order of high to low energy values, in a number of fingers in said mobile communication system.

18. The apparatus of claim 17, wherein the first channel energy searcher comprises:

first and second coherent accumulators;

a first energy calculator for calculating said energy of the DPCCH based on a respective coherently accumulated signal outputted by the first and second coherent accumulators; and a first noncoherent accumulator for noncoherently accumulating an output of the first energy calculator.

19. The apparatus of claim 18, wherein the second channel energy searcher comprises:

third and fourth multipliers for dechannelizing the despread I and Q channel signals generated by the complex despreader by multiplying the despread I and Q channel signals by the orthogonal variable spreading factor (OVSF) to distinguish the channel and to generate said dechannelized despread I and Q channel signals;

third and fourth coherent accumulators for coherently accumulating said dechannelized despread I and Q channel signals, respectively;

a second energy calculator for calculating said energy value of said DPDCH from a respective coherent accumulation signal generated by the third and fourth coherent accumulators; and a second noncoherent accumulator for noncoherently accumulating an output of the second energy calculator.

20. The apparatus of claim 17, wherein the two weights being complements to each other and the sum of the two being 1, and the digital signal processor outputs the weights to the first multiplier and the second multiplier, respectively.

21. The apparatus of claim 20, wherein if the spreading factor ($SF_k$) of the digital signal processor varies from 4 through 256, and the spreading factor ($SF_k$)=256($2^k$), where k ranges from 0 to 6, then the digital signal processor outputs the first channel weight (Wc) corresponding to the spreading factor ($SF_k$) of the DPDCH as $(256/SF_k)/((256/SF_k)+1)$, and the digital signal processor outputs the second channel weight (Wd) as $1/((256/SF_k)+1)$.

* * * * *